US012798600B2

(12) United States Patent
Sharma et al.

(10) Patent No.: US 12,798,600 B2
(45) Date of Patent: Nov. 17, 2026

(54) VEHICLE ROUTE RECOMMENDATIONS FOR AVOIDING COLLISIONS IN HOT LANE CHANGE SITUATIONS

(71) Applicant: GM GLOBAL TECHNOLOGY OPERATIONS LLC, Detroit, MI (US)

(72) Inventors: Manoj Kumar Sharma, Troy, MI (US); Akilesh Rajavenkatanarayanan, Clinton Township, MI (US); Donald K. Grimm, Utica, MI (US); Shu Chen, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 106 days.

(21) Appl. No.: 18/912,209

(22) Filed: Oct. 10, 2024

(65) Prior Publication Data

US 2026/0103209 A1 Apr. 16, 2026

(51) Int. Cl.
*B60W 50/14* (2020.01)
*B60K 35/28* (2024.01)
(Continued)

(52) U.S. Cl.
CPC ............. *B60W 50/14* (2013.01); *B60K 35/28* (2024.01); *B60W 30/18163* (2013.01); (Continued)

(58) Field of Classification Search
CPC ........... B60W 50/14; B60W 30/18163; B60W 40/08; B60W 2050/146; B60W 2540/22; (Continued)

(56) References Cited

U.S. PATENT DOCUMENTS 9,672,734 B1 * 6/2017 Ratnasingam ... G08G 1/096741
11,402,851 B2 * 8/2022 Stein .................... G06V 20/588
(Continued)

FOREIGN PATENT DOCUMENTS

DE 102014002115 A1 8/2015
DE 102015015944 A1 * 6/2017 ............ G08G 1/164
(Continued)

OTHER PUBLICATIONS

German Office Action from counterpart DE1020241362375, dated Oct. 6, 2025.
(Continued)

*Primary Examiner* — Eric Blount

(57) ABSTRACT

A vehicle system includes a control module configured to determine one or more reliability scores for each road segment of a plurality of road segments of a lane, modify the one or more reliability scores for each road segment based on a number of vehicles changing lanes and/or a time taken for the vehicles to change lanes, select a road segment with the highest reliability score, determine a lane merge feasibility based on an expected headway value, a vehicle lane change ratio for vehicles, and a time gap to change lanes, determine a modified lane merge feasibility based on a number of vehicles making lateral moves into and out of the lane, and identify the selected road segment as a portion to avoid when merging into the lane based on the modified lane merge feasibility. Other example vehicle systems and control methods are also disclosed.

20 Claims, 12 Drawing Sheets

800

(51) Int. Cl.
*B60W 30/18* (2012.01)
*B60W 40/08* (2012.01)

(52) U.S. Cl.
CPC ..... *B60W 40/08* (2013.01); *B60K 2360/1868* (2024.01); *B60K 2360/191* (2024.01); *B60W 2050/146* (2013.01); *B60W 2540/22* (2013.01); *B60W 2554/4045* (2020.02); *B60W 2556/20* (2020.02)

(58) Field of Classification Search
CPC ...... B60W 2554/4045; B60W 2556/20; B60K 35/28; B60K 2360/1868; B60K 2360/191
USPC ........................................................ 340/425.5
See application file for complete search history.

(56) References Cited

U.S. PATENT DOCUMENTS

| | | | |
|---|---|---|---|
| 2014/0297181 | A1 | 10/2014 | Kondo et al. |
| 2018/0234901 | A1 | 8/2018 | Suh et al. |
| 2019/0196472 | A1 | 6/2019 | Körner et al. |
| 2019/0316919 | A1 | 10/2019 | Keshavamurthy et al. |
| 2019/0329770 | A1 | 10/2019 | Rajab et al. |
| 2020/0124438 | A1 | 4/2020 | Fowe |
| 2020/0124439 | A1 | 4/2020 | Fowe |
| 2020/0342760 | A1 | 10/2020 | Vassilovski et al. |
| 2020/0361495 | A1 | 11/2020 | Namba |
| 2020/0377083 | A1 | 12/2020 | Kokaki et al. |
| 2021/0104155 | A1 | 4/2021 | Xu et al. |
| 2021/0156708 | A1 | 5/2021 | Wojcik et al. |
| 2022/0048535 | A1 | 2/2022 | Niendorf et al. |
| 2023/0005364 | A1* | 1/2023 | Walter ................. G08G 1/0112 |
| 2023/0339470 | A1 | 10/2023 | Hay et al. |
| 2024/0116510 | A1 | 4/2024 | Li et al. |
| 2025/0010876 | A1* | 1/2025 | Schiller ................. B60W 50/14 |
| 2025/0115247 | A1* | 4/2025 | Cho ..................... G06V 20/588 |
| 2025/0171024 | A1 | 5/2025 | Saito et al. |
| 2025/0296576 | A1 | 9/2025 | Liu et al. |

FOREIGN PATENT DOCUMENTS

| | | | |
|---|---|---|---|
| DE | 102018107508 | A1 | 10/2018 |
| DE | 102020117160 | B3 | 10/2021 |
| DE | 102020117159 | A1 | 12/2021 |
| DE | 102022109973 | A1 | 10/2023 |
| DE | 102023117375 | A1 | 1/2025 |

OTHER PUBLICATIONS

German Office Action from counterpart DE1020241351039, dated May 12, 2025.

German Office Action from DE1020241344016, dated Jun. 13, 2025.

* cited by examiner

800

900

VEHICLE ROUTE RECOMMENDATIONS FOR AVOIDING COLLISIONS IN HOT LANE CHANGE SITUATIONS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle route recommendations for hot lane change situations, and more particularly to vehicle systems and methods for providing vehicle route recommendations for avoiding collisions in hot lane change situations based in part on telemetry crowdsourced data.

Vehicles often include navigation systems for vehicle tracking and providing instructions about upcoming maneuvers to reach desired locations. In such examples, the instructions may be provided to drivers of the vehicles or used for vehicle control in autonomous driving applications in the vehicles. In some scenarios, the navigation systems may rely on crowdsourced data from other vehicles to generate the instructions.

SUMMARY

A vehicle system for providing vehicle lane recommendations for a vehicle traveling on a road, includes a control module and a display module in communication with the control module. The control module is configured to determine one or more reliability scores for each road segment of a plurality of road segments of a lane on the road based on a frequency of which each vehicle of a plurality of vehicles has traveled on the road, modify the one or more reliability scores for each road segment based on at least one of a number of vehicles changing lanes and a time taken for the vehicles to change lanes, select a road segment of the road segments with the highest modified reliability score, determine a lane merge feasibility based on an expected headway value, a vehicle lane change ratio for vehicles, and a time gap to change lanes, determine a modified lane merge feasibility based on the lane merge feasibility and a number of vehicles making lateral moves into and out of the lane, and identify the selected road segment as a portion of the road to avoid when merging into the lane based on the modified lane merge feasibility. The display module is configured to output a visual representation of the portion highlighted to indicate a recommendation to avoid when merging into the lane.

In other features, the vehicle system further includes a vehicle control module in communication with the control module. The vehicle control module is configured to control the vehicle to avoid the portion when merging into the lane.

In other features, the control module is configured to modify the one or more reliability scores for each road segment based on a number of lane change events, a severity of each lane change event, and braking incidents associated with each lane change event.

In other features, the control module is configured to modify the one or more reliability scores for each road segment based on the number of vehicles changing lanes and the time taken for the vehicles to change lanes.

In other features, each reliability score for each road segment is specific to a different driving condition.

In other features, the control module is configured to select the road segment with the highest reliability score having the driving condition that corresponds to a current driving condition associated with the vehicle.

In other features, the driving condition includes at least one of a different time of day, a different road condition, and a different weather condition.

In other features, the control module is configured to modify the time gap to change lanes based on a cognitive status of a driver of the vehicle, thereby adjusting the lane merge feasibility.

In other features, the control module is configured to determine a cognitive status value of a driver of the vehicle, and in response to the cognitive status value of the driver being greater than a threshold, identify another road segment prior to the portion of the road to avoid for merging into the lane.

In other features, the control module is configured to modify the time gap to change lanes based on a condition of the road, thereby adjusting the lane merge feasibility.

A vehicle system for providing vehicle lane recommendations for a vehicle traveling on a road, includes a control module and a vehicle control module in communication with the control module. The control module is configured to determine one or more reliability scores for each road segment of a plurality of road segments of a lane on the road based on a frequency of which each vehicle of a plurality of vehicles has traveled on the road, modify the one or more reliability scores for each road segment based on at least one of a number of vehicles changing lanes and a time taken for the vehicles to change lanes, select a road segment of the road segments with the highest modified reliability score, determine a lane merge feasibility based on an expected headway value, a vehicle lane change ratio for vehicles, and a time gap to change lanes, determine a modified lane merge feasibility based on the lane merge feasibility and a number of vehicles making lateral moves into and out of the lane, and identify the selected road segment as a portion of the road to avoid when merging into the lane based on the modified lane merge feasibility. The vehicle control module is configured to control the vehicle to avoid the portion when merging into the lane.

In other features, the control module is configured to modify the one or more reliability scores for each road segment based on a number of lane change events, a severity of each lane change event, and braking incidents associated with each lane change event.

In other features, the control module is configured to modify the one or more reliability scores for each road segment based on the number of vehicles changing lanes and the time taken for the vehicles to change lanes.

In other features, each reliability score for each road segment is specific to a different driving condition.

In other features, the control module is configured to select the road segment with the highest reliability score having the driving condition that corresponds to a current driving condition associated with the vehicle.

In other features, the driving condition includes at least one of a different time of day, a different road condition, and a different weather condition.

In other features, the control module is configured to modify the time gap to change lanes based on a cognitive status of a driver of the vehicle, thereby adjusting the lane merge feasibility.

In other features, the control module is configured to determine a cognitive status value of a driver of the vehicle, and in response to the cognitive status value of the driver being greater than a threshold, identify another road segment prior to the portion of the road to avoid for merging into the lane.

In other features, the control module is configured to modify the time gap to change lanes based on a condition of the road, thereby adjusting the lane merge feasibility.

A vehicle control method for providing vehicle lane recommendations for a vehicle traveling on a road and approaching an interchange, includes determining one or more reliability scores for each road segment of a plurality of road segments of the road based on a frequency of which each vehicle of a plurality of vehicles has traveled on the road, wherein each reliability score for each road segment is specific to a different driving condition, modifying the one or more reliability scores for each road segment based on at least one of a number of vehicles changing lanes and a time taken for the vehicles to change lanes, selecting a road segment of the road segments with the highest modified reliability score having the driving condition that corresponds to a current driving condition associated with the vehicle, determining a lane merge feasibility based on an expected headway value, a vehicle lane change ratio for vehicles, and a time gap to change lanes, determining a modified lane merge feasibility based on the lane merge feasibility and a number of vehicles making lateral moves into and out of the lane, identifying the selected road segment as a portion of the road to avoid when merging into the lane based on the modified lane merge feasibility, and outputting a visual representation of the portion highlighted to indicate a recommendation to avoid when merging into the lane.

In other features, the vehicle control method further includes controlling the vehicle to avoid the portion when merging into the lane.

In other features, the vehicle control method further includes modifying the one or more reliability scores for each road segment based on a number of lane change events, a severity of each lane change event, and braking incidents associated with each lane change event.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Vehicles include navigation systems for providing instructions about upcoming maneuvers to reach desired locations. To provide such instructions, current navigation systems may rely on road level information (e.g. high-level maps) and crowdsourced data. In some instances, to complete the upcoming maneuvers, drivers may encounter complex scenarios, such as a highway merge followed by an exit where the exit traffic tries to merge to an outer (e.g., exit) lane of the highway while the incoming traffic tries to merge to an inner lane (e.g., away from the outer lane). In such scenarios, multiple vehicles may attempt to merge into the same lane at the same location and time. This creates substantial confusion and collision prone situations.

The vehicle systems and vehicle control methods according to the present disclosure provide solutions for enabling lane traffic awareness to support comfortable navigation and merging experiences in detected hot lane change situations. For example, using traffic lane statistics derived from crowdsourced telemetry data, the vehicle systems and methods can provide a vehicle with spatial and temporal lane recommendations to avoid potential collision in detected hot lane change situations when merging into a lane and help with smooth transitions between lanes. Such lane recommendations may be incorporated into a map for a display in the vehicle and/or used for route planning in autonomous driving applications in the vehicle.

Figure 1:
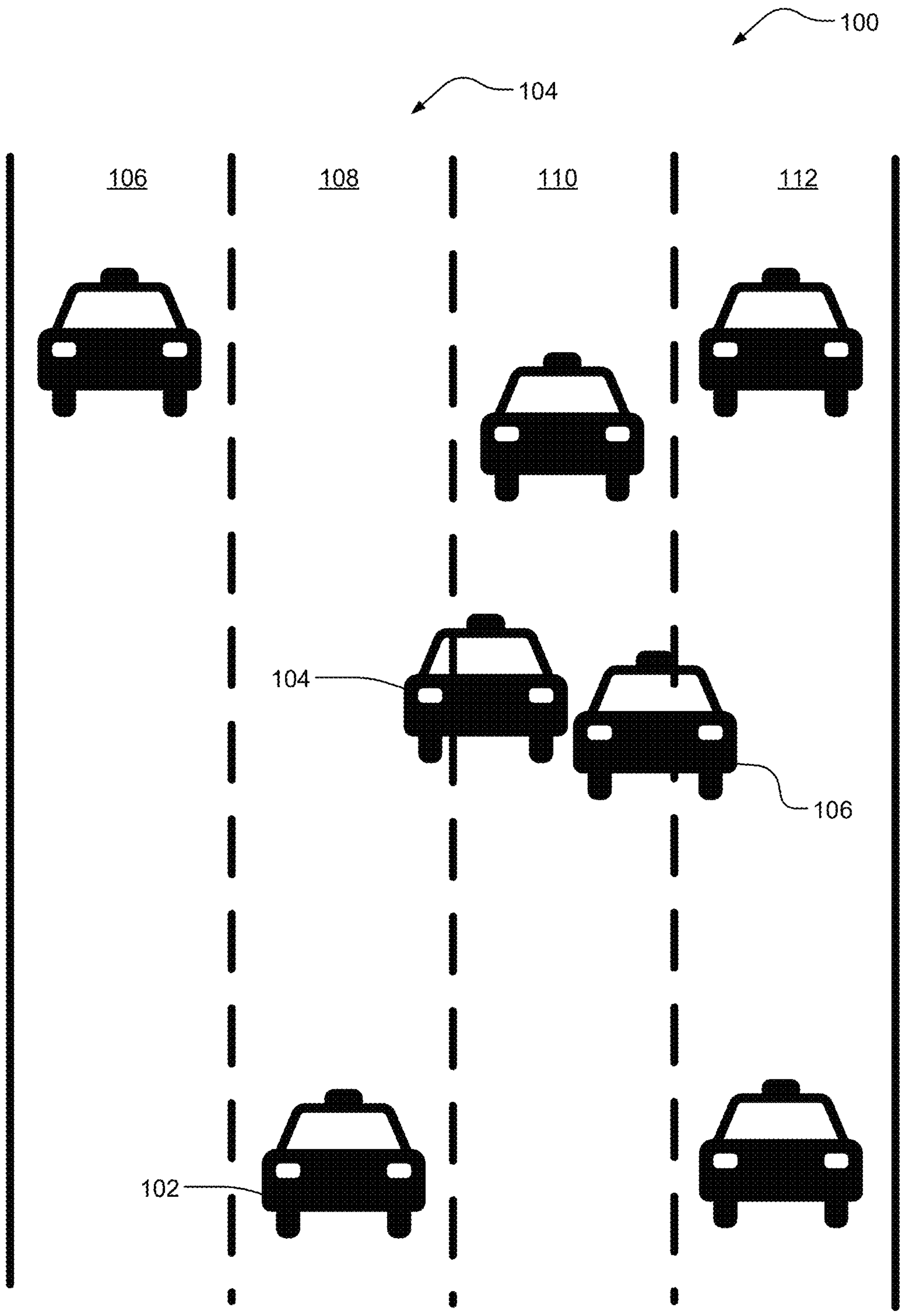
FIG. 1 is a map showing a complex driving scenario for a vehicle traveling along a multi-lane road, according to the present disclosure.

For example, FIG. 1 depicts a map 100 providing a complex driving maneuver scenario in which a vehicle 102 is traveling along a road 104 including multiple lanes 106, 108, 110, 112. In this example, the complex driving maneuver scenario represents an encounter in which the vehicle 102 approaches a co-located entrance and exit lane, such as the lane 110 of the multi-lane road 104 (e.g., a multi-lane highway). Such encounters may cause a high degree of traffic crossover in which multiple vehicles, such as vehicles 114, 116 are attempting to merge across or into the lane 110 at the same time and location due to the influx and outflow of vehicle traffic at the co-located entrance and exit lane. This traffic crossover creates an unpredictable and dynamic scenario that drivers want to avoid.

Figure 2:
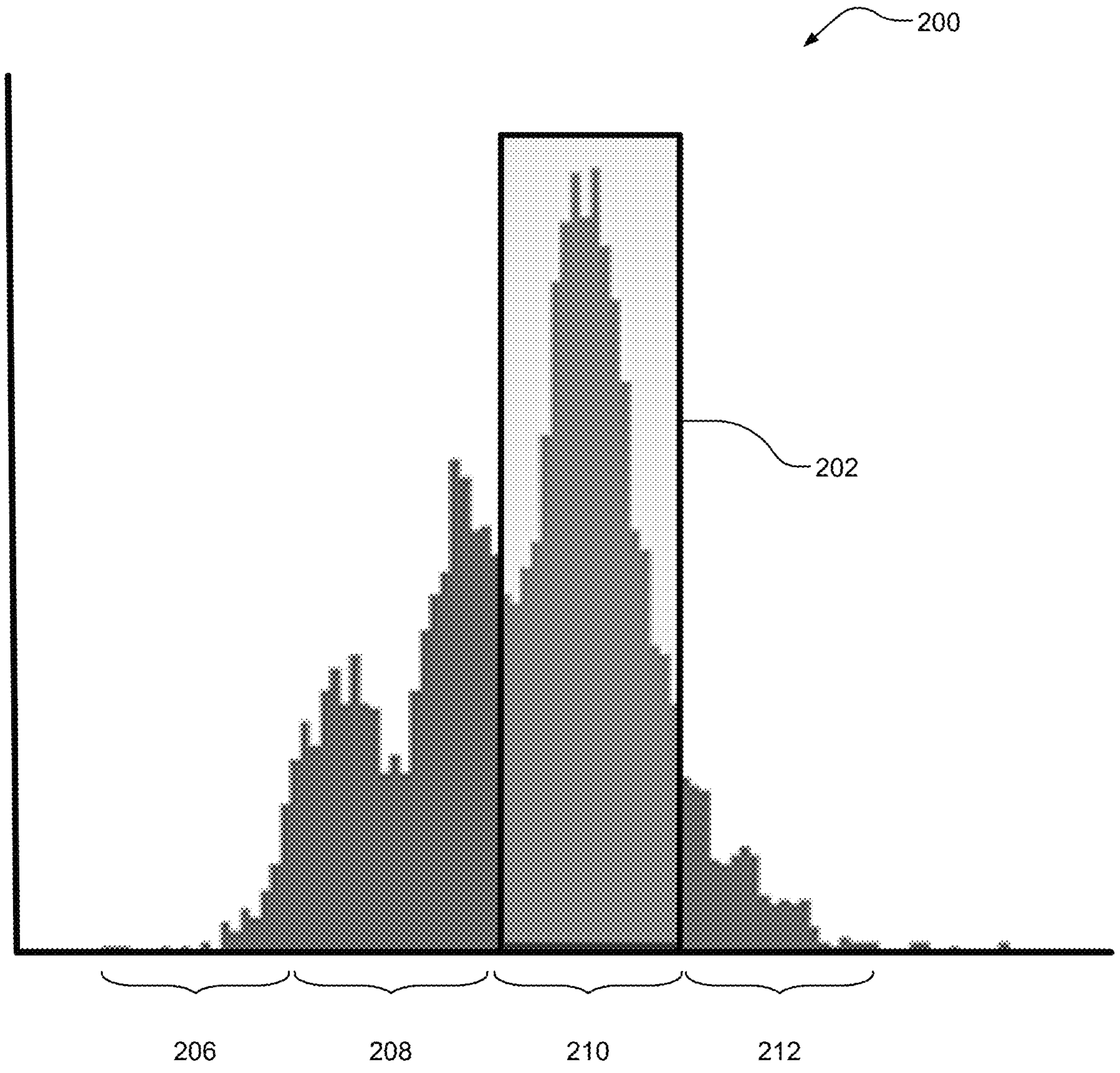
FIG. 2 is a graph showing data representing lane change ratios for the lanes of FIG. 1, according to the present disclosure.

As such, to improve navigation comfort and collision avoidance, the vehicle systems and vehicle control methods herein may generate spatial and temporal lane recommendations (e.g., maneuver instructions, etc.) to avoid such locations or hot lane change zones based upon current and historical traffic profile data that indicates substantial traffic crossover, as further explained herein. For example, FIG. 2 depicts a graph 200 showing data representing lane change ratios for the lanes 106, 108, 110, 112 of FIG. 1. For instance, in FIG. 2, section 206 of the graph 200 represents a scaled lane change ratio for the lane 106, section 208 represents a scaled lane change ratio for the lane 108, section 210 represents a scaled lane change ratio for the lane 110, and section 212 represents a scaled lane change ratio for the lane 112. In this example, a portion of the lane 110 may be designed as a hot lane change zone 202 to avoid due to the section 210 having the highest scaled lane change ratio.

Figure 3:
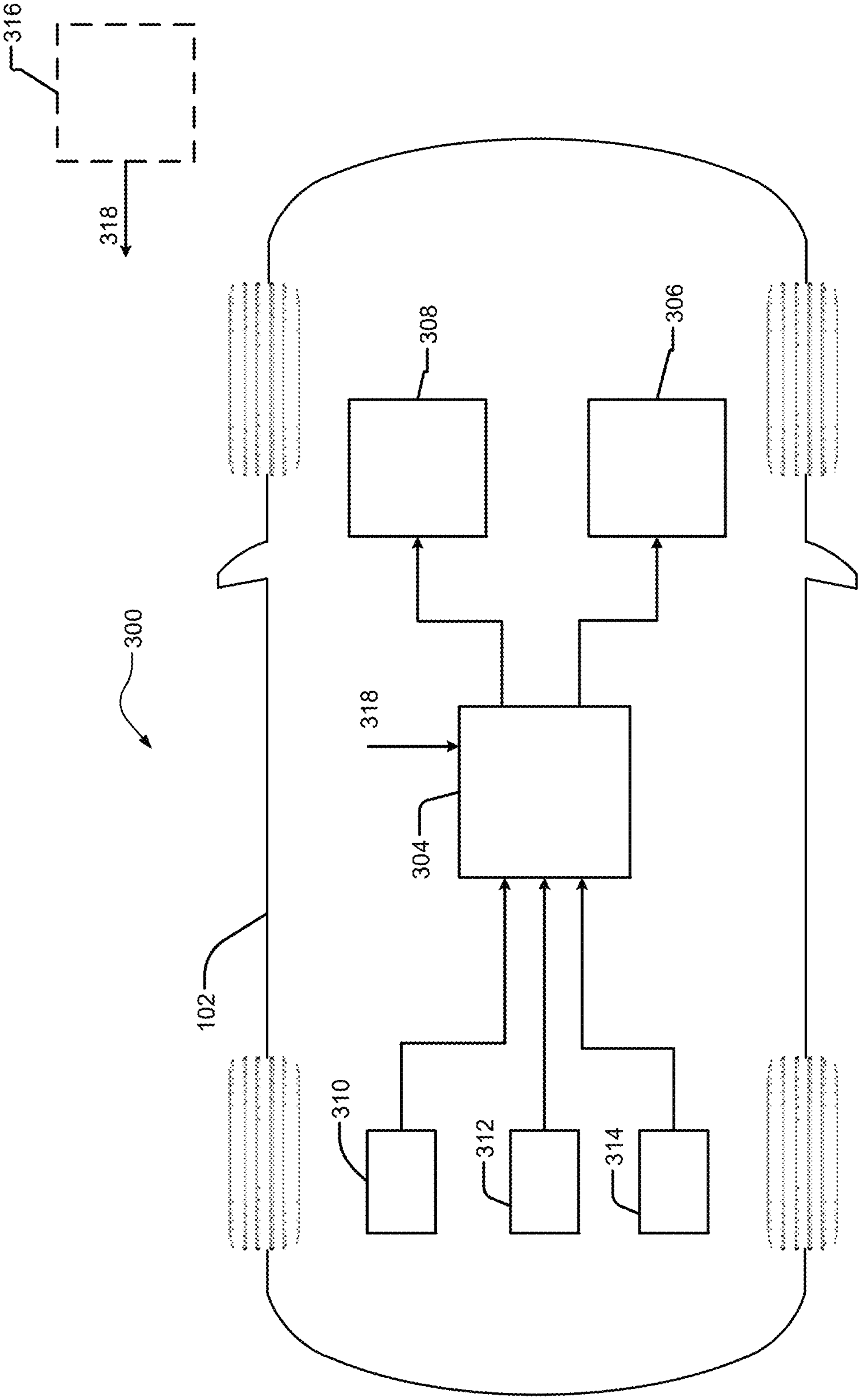
FIG. 3 is a block diagram of an example vehicle system for providing vehicle lane recommendations for a vehicle, according to the present disclosure.

Referring now to FIG. 3, a block diagram of an example vehicle system 300 is shown for providing vehicle lane recommendations for the vehicle 102 traveling on the road 104 of FIG. 1. In FIG. 3, the vehicle system 300 generally includes a control module 304 internal to the vehicle 102, a display module 306, a vehicle control module 308 for controlling at least one operation of the vehicle 102, and multiple onboard sensors 310, 312, 314. Although FIG. 3 illustrates the vehicle system 300 as including specific dedicated modules, it should be appreciated that one or more other modules may be employed if desired. For example, any combination of the modules (e.g., the control module 304, the display module 306, the vehicle control module 308, etc.) and/or the functionality thereof may be integrated into a single module or multiple different modules. Additionally, although FIG. 3 illustrates three onboard sensors 310, 312, 314, it should be appreciated that any number of sensors can be arranged on the vehicle 102 if desired.

With continued reference to FIG. 3, the vehicle system 300 may be employable in any suitable vehicle, such as an autonomous vehicle, a semi-autonomous vehicle, etc. Additionally, the vehicle system 300 may be applicable to electric vehicles (e.g., a pure electric vehicle, a plug-in hybrid electric vehicle, etc.) and internal combustion engine (ICE) vehicles. In the example of FIG. 3, the vehicle system 300 is employed in the vehicle 102 (e.g., an autonomous vehicle).

In the example of FIG. 3, the onboard sensors 310, 312, 314, the display module 306, and the vehicle control module 308 are in communication with the control module 304. In such examples, the modules and sensors of the vehicle system 300 may share parameters via a network, such as a controller area network (CAN) and signals. For example, in FIG. 3, the control module 304 receives signals representing data from the sensors 310, 312, 314 and transmits signals to the display module 306 for displaying lane recommendations and the vehicle control module 308 for controlling vehicle operation.

In various embodiments, and as further explained herein, aspects of creating the vehicle lane recommendations may be implemented onboard the vehicle 102 itself and/or external to the vehicle 102. For example, the control module 304 may perform functions for creating spatial and temporal vehicle lane recommendations. In other examples, the vehicle system 300 may include an optional control module 316 external to the vehicle 102 and in communication with the control module 304 onboard the vehicle 102. In such examples, the control module 316 may perform some or all of the functions explained herein for creating spatial and temporal vehicle lane recommendations. For instance, and as further explained herein, the external (or remote) control module 316 may generally determine reliability scores for road segments (e.g., based on telemetry crowdsourced data), and the control module 304 may generally select one of the road segments, determine a lane merge feasibility, modify the lane merge feasibility, and then identify the selected road segment as a portion of the road to avoid. While the control functions for creating lane recommendations are explained below specific to both control modules 304, 316, it should be appreciated that either control module may separately implement the control functions itself.

In the example of FIG. 3, the control module 304 may receive one or more onboard inputs. For example, the onboard sensors 310, 312, 314 may detect one or more characteristics and provide one or more onboard inputs to the control module 304, such as vehicle acceleration, environmental data (e.g., characteristics of other vehicles, road conditions, weather conditions, etc.) external of the vehicle 102, driver characteristics (e.g., attentiveness of the driver, stress of the driver, drowsiness of the driver, etc.), etc. In such examples, the onboard sensors 310, 312, 314 may include, for example, external cameras (e.g., front camera modules, side camera modules, etc.), acceleration sensors, internal cameras (e.g., eye trackers, etc.), and/or any other suitable sensors. In some examples, the control module 304 may receive onboard inputs from automated driving systems, computer vision systems, etc. In various embodiments, some or all of the received onboard inputs from the onboard sensors 310, 312, 314 or otherwise may be transmitted to the control module 316.

Additionally, the control module 304 may receive one or more offboard inputs. Such offboard inputs may include, for example, data from one or more road databases, location data (e.g., from a global positioning system), and/or communications from vehicle-to-everything (V2X) systems, dedicated short range communications (DSRC) systems, cellular systems, etc. In such examples, some or all of the offboard inputs may be provided from the control module 316. More specifically, the some or all of the offboard inputs may be provided via one or more signals 318.

With continued reference to FIG. 3, the control module 316 receives crowdsourced data from vehicles, including possibly the vehicle 102, over a period of time that have traveled along the road. In such examples, the data may be telemetry data relating to, for example, vehicle characteristics. For instance, the crowdsourced data may include data relating to vehicle speeds, vehicle acceleration, vehicle deacceleration, location data, vehicle counts, frequency of travel, etc. In some examples, the location data may include, for example, latitudes, longitudes, headings, headways, and corresponding timestamps. In such examples, information may be ascertained from the crowdsourced data, such as a frequency (e.g., daily, weekly, etc.) of which a vehicle has traveled through a defined region of the road, a frequency or number of braking incidents for the vehicles in the defined region of the road, etc.

Then, the control module 316 identifies road segments along the road for merging into a lane based on the crowdsourced data. For example, the control module 316 may utilize portions (e.g., location data, vehicle counts, etc.) of the crowdsourced data specific to a defined region of the road to identify the road segments most used by the vehicles (providing the crowdsourced data) to merge into the lane. In such examples, the defined region may be an area of interest of the road.

Figure 4:
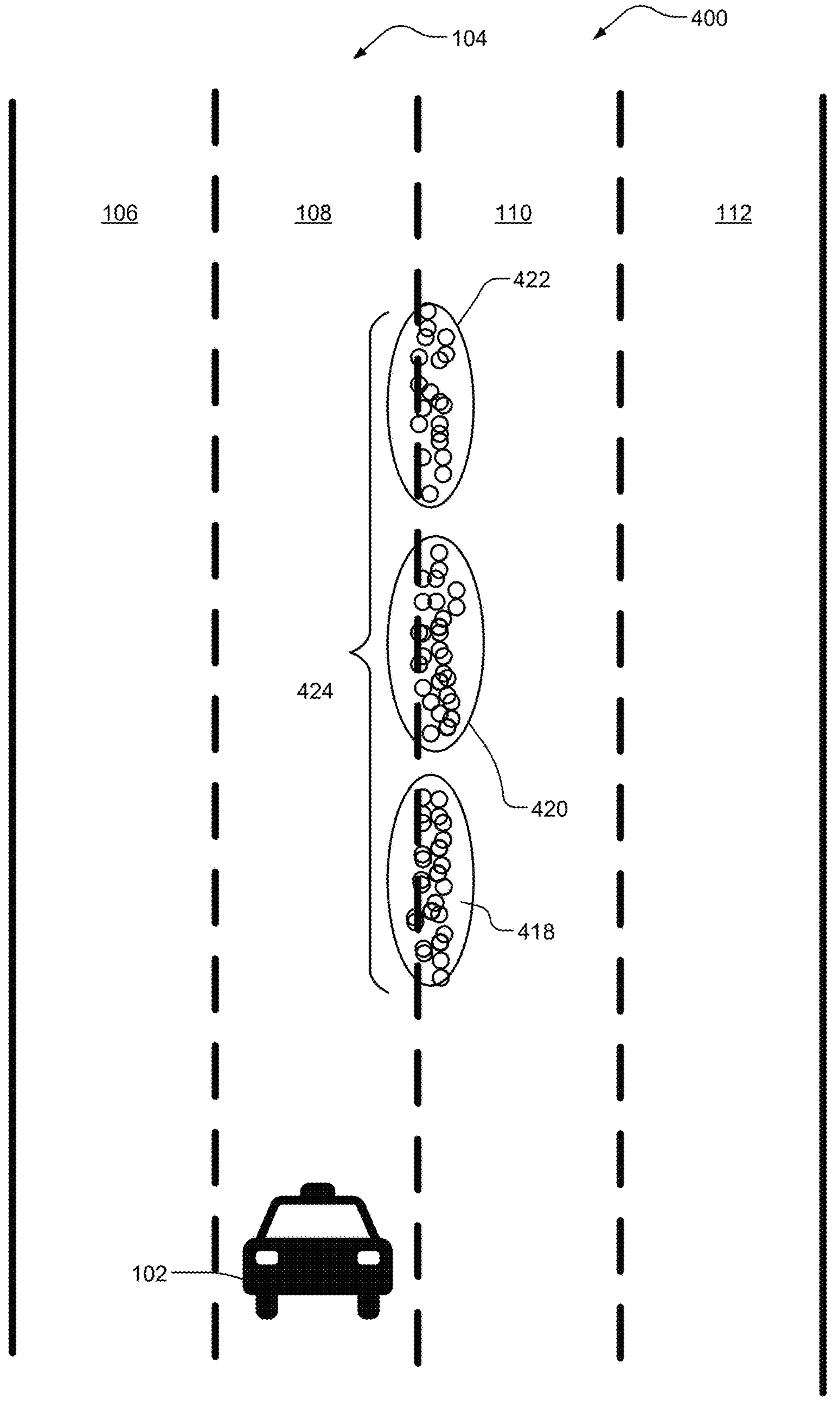
FIG. 4 is a map showing a multi-lane road, with road segments identified by the vehicle system of FIG. 3, according to the present disclosure.

For example, FIG. 4 depicts a map 400 showing identified road segments. Specifically, in FIG. 4, the map 400 includes the multi-lane road 104 of FIG. 1 with the lanes 106, 108, 110, 112. In this example, the vehicle 102 is currently traveling in the lane 108 but desires to move into the lane 110 according to, for example, instructions from a navigation system. Although the example of FIG. 4 depicts the road 104 with four lanes, it should be appreciated that the road 104 of FIG. 4 (and/or of FIG. 1) may include more or less lanes.

In the example of FIG. 4, the control module 316 of FIG. 3 may cluster data (shown by circles) in a defined region 424 relating to where vehicles providing crowdsourced data have merged into the lane 110 from the lane 108. Then, the control module 316 identifies a road segment 418, 420, 422 associated with each cluster of data. In this example, the clusters may represent the road segments 418, 420, 422 where most of the vehicles merge to the lane 110 (from the lane 108). Although the example of FIG. 4 depicts three road segments, it should be appreciated that more or less road segments may be identified associated with merging into the lane 110 if desired and/or based on the clustered data, the defined region, etc.

With continued reference to FIGS. 3-4, the control module 316 then determines reliability scores for the road segments 418, 420, 422 in the defined region 424. In such examples, the reliability scores may be determined based on merged location data of the vehicles providing the crowdsourced data and that traveled into the defined region 424 of the road 104. For example, the control module 316 may determine a reliability score for each road segment 418, 420, 422 based on the frequency of which each vehicle has traveled into the defined region 424 of the road 104. As such, each reliability score generally represents a level of reliability associated with the crowdsourced data.

In various embodiments, the control module 316 may determine one or multiple reliability scores for each road segment 418, 420, 422. For example, each reliability score for a road segment may be determined and specific to a different driving situation or condition, such as morning, afternoon, nighttime, bad weather, etc. In such examples, the control module 316 may generate multiple clusters based on the location data specific to each driving condition and then determine a reliability score for each road segment and driving condition. In such examples, the driving condition may be a different time of day (e.g., 7:30 AM, morning, morning rush hour, afternoon drive, evening rush hour, after dark, etc.), a different day (e.g., Monday, Friday, Sunday, weekday, weekend, etc.), a road condition (e.g., icy, wet, dry, etc.), a weather condition (e.g., foggy, raining, snowing, etc.), etc.

In some examples, the control module 316 may determine each reliability score based on the area familiarity of the vehicles providing the crowdsourced data. For example, the control module 316 may determine familiarity scores for the vehicles in each road segment 418, 420, 422 based on the frequency of which the vehicles have traveled through the defined region 424 (e.g., an area of interest of the road) and then determine the reliability scores for the road segments based on the familiarity scores.

As one example, a reliability score for a road segment may be determined according to equation (1) below in which a vehicle count (V) is divided based on the area familiarity of the vehicles. In this example, the reliability score is computed by multiplying each vehicle count (V) for a different level of familiarity and a corresponding weight value (ω) and then summing the results. The vehicle counts may be obtained from the crowdsourced data.

$$R_{Score} = \sum[\omega_H V_1 + \omega_M V_2 + \omega_L V_3 + \omega_0 V_4] \qquad \text{Equation (1)}$$

In equation (1) above, $V_1$ represents the number of vehicles (or a vehicle count) which pass through the area of interest of the road 104 every day (e.g., every weekday), $V_2$ represents the number of vehicles which pass through the area of interest at least one a week, $V_3$ represents the number of vehicles which pass through the area of interest a few times (e.g., less than once a week, etc.), and $V_4$ represents the number vehicles which are new to the area (e.g., have never passed through the area of interest). Additionally, in equation (1), $\omega_H$ represents a high reliability/familiarity score weight, $\omega_M$ represents a medium reliability/familiarity score weight, $\omega_L$ represents a low reliability/familiarity score weight, and $\omega_0$ represents a zero reliability/familiarity score weight. In such examples, the high reliability/familiarity score weight is the largest value (e.g., most weight) whereas the low reliability/familiarity score weight is the lowest value (e.g., least weight). The corresponding weight values (ω) for each vehicle count may be defined and tuned as desired. As example only, $\omega_H$ may be 0.8, $\omega_M$ may be 0.5, $\omega_L$ may be 0.2, and $\omega_0$ may be zero.

In some examples, some or all of the reliability scores may be modified one or more times if desired. For example, the control module 316 may modify one or more reliability scores for each road segment 418, 420, 422 based on lane change occurrences and the type of each lane change occurrence (e.g., normal lane change, aggressive lane change, multi-lane change, etc.). In such examples, the control module 316 may identify a number of lane change events in a road segment and the type of each lane change (e.g., an intensity level of each lane change) from the crowdsourced telemetry data, and then modify a reliability score accordingly. As one example, the control module 316 may determine a modified reliability score ($R_{Score-mod}$) according to equation (2) below.

$$R_{Score-mod} = R_{Score} - \sum \alpha_i \delta_i \qquad \text{Equation (2)}$$

In equation (2), i represents the number of lane change events and alpha (α) represents a weight based on the lane change intensity, delta (δ) is a fixed value reliability score decrement per lane change event (or occurrence), and $R_{score}$ represents the original reliability score. In such examples, the lane change intensity for each lane change event may be a lateral severity associated with the lane change, with the weight value being different for different levels of lateral severity. For example, the weight value for a multi-lane change may be greater than the weight value for an aggressive lane change (e.g., high lateral speed, small longitudinal distance, abrupt deacceleration, etc.), and the weight value for the aggressive lane change may be greater than the weight value for a normal lane change.

Additionally, in some embodiments, the control module 316 may modify one or more reliability scores for each road segment 418, 420, 422 based on a number of vehicles changing lanes at a given instance. As one example, the control module 316 may determine a modified reliability score ($R_{Score-mod2}$) according to equation (3) below. In equation (3), j represents the number of vehicles merged to the lane 110 of FIG. 4 at a given instance, beta (β) is a scaling parameter, $t_j$ represents a time for the vehicle in question to merge, to represents a designated time for merging, and $R_{Score\text{-}mod}$ represents the previously modified reliability score in equation (2). In other examples, equation (3) may include $R_{score}$ (the original reliability score) instead of $R_{Score\text{-}mod}$.

$$R_{Score\text{-}mod2} = R_{Score\text{-}mod} - \sum_j \beta_j (t_j - t_0) \quad \text{Equation (3)}$$

In various embodiments, the control module 316 may store each of the determined reliability scores in a database. The stored reliability scores may be modified as explained above or not. In such examples, the database may include segment information relating to the road segments 418, 420, 422 corresponding to the reliability scores, driving conditions corresponding to the reliability scores, etc. This database (or data therein) may be accessible and/or provided to the control module 304 for creating lane merging recommendations.

With continued reference to FIG. 3, the control module 304 selects one of the road segments 418, 420, 422 with the highest reliability score for use in creating lane merging recommendations. In some examples, when the reliability scores are generated according to different driving conditions, the control module 304 may select the road segment with the highest reliability score having a driving condition that corresponds to a current driving condition associated with the vehicle 102. For instance, the control module 304 may determine the current driving condition (e.g., morning, afternoon, nighttime, bad weather, etc.) based on inputs from the sensors 310, 312, 314, inputs from other onboard sensors, and/or inputs from external sources. Then, based on the current driving condition, the control module 304 may select the road segment with the highest reliability score for that equivalent driving condition.

Then, the control module 304 determines a lane merge feasibility for the selected road segment. For example, at a time of interest or another driving condition, the road segment 420 of FIG. 4 may have a greater reliability score than reliability scores for the road segments 418, 422. In this example, the control module 304 selects the road segment 420 and then a lane merge feasibility for that road segment 420.

In various embodiments, the control module 304 may determine the lane merge feasibility based on various parameters, such as an expected headway value, a vehicle lane change ratio for vehicles, and a time gap to change lanes. In such examples, the control module 304 may determine a probability of having a time gap to change lanes based on the expected headway value, and then determine the lane merge feasibility based on this probability.

As one example, the control module 304 may determine the probability of having a time gap to change lanes and the lane merge feasibility for the selected road segment (e.g., the road segment 420), according to equations (4)-(10) below. In such examples, the control module 304 may apply a probabilistic model to estimate a successful lane change probability, incorporating the assumption that a global positioning system (GPS) position, headway telemetry, host lane determination, and per-lane vehicle positions follow a Poisson point process of an expected headway. Here, the Poisson point process represents randomly located points. Such data may be collected from a headway sample record, which includes a latitude, a longitude, a heading, a headway, and timestamp data. In such examples, a headway is a measure of a temporal space between two vehicles (e.g., the vehicle 102 and another vehicle). For instance, the headway may be the time that elapses between the arrival of a leading vehicle at a designated test point and the arrival of a following vehicle at the same designated test point. The headway may be generally expressed in seconds per vehicle.

For example, an expected headway (λ) may be defined according to equation (4) below. Here, an average headway may be determined considering a headway sample (e.g., a designated headway H) from the crowdsourced telemetry data.

$$\lambda = avg(H) \quad \text{Equation (4)}$$

Then, considering a virtual road segment ($S_0$) and the expected headway (λ), a vehicle count (V) in that virtual road segment ($S_0$) may be determined according to equation (5). In such examples, the virtual road segment ($S_0$) may correspond to a length of the selected road segments and the expected headway (λ) may be determined from equation (4) above.

$$V = S_0/\lambda \quad \text{Equation (5)}$$

In some examples, the control module 304 may determine an average cut in ratio (or an average lane change ratio) for the selected road segment. As one example, the control module 304 may determine the average cut in ratio according to equation (6) below. In equation (6), θ (theta) represents the average cut in ratio and $A_{lc}$ represents a vehicle lane change ratio for vehicles, for example, merging into the lane 110. In such examples, the lane change ratio is a ratio of the number of safe lane changes performed to the total number of desired lane changes. Such data may be obtained from the crowdsourced telemetry data.

$$\theta = avg(A_{lc}) \quad \text{Equation (6)}$$

Then, the control module 304 may determine a new vehicle count number based on the average cut in ratio (θ) from equation (6). For example, the control module 304 may determine this new count number according to equation (7) below. In equation (7), $V_1$ represents the new vehicle count number in the virtual road segment ($S_0$), V represents the previous vehicle count from equation (5) above, and θ represents the average cut in ratio from equation (6) above. In various embodiments, the new vehicle count number ($V_1$) may be implemented in equation (5) instead of the previous vehicle count (V), to obtain a modified (or new) expected headway (λ).

$$V_1 = V - \theta \quad \text{Equation (7)}$$

Then, the control module 304 may determine a time to perform a safe lane change, according to equation (8) below. For example, assuming an upcoming vehicle moves at a speed ($v_1$) and a safe lane change requires a vehicle gap distance ($d_0$), a time gap ($t_1$) to perform a safe lane change can be estimated with equation (8) below.

$$t_1 = d_0/v_1 \quad \text{Equation (8)}$$

Next, the control module 304 may then determine a probability of having a time gap to change lanes in the selected road segment, according to equation (9) below. For example, in equation (9), the probability that a random time (t) is greater than the time gap ($t_1$) to perform a safe lane change is computed based on the modified expected headway (λ) determined above.

$$P(t > t_1) = e^{-\lambda t} \quad \text{Equation (9)}$$

Because the vehicle 102 is intending to switch lanes, it may be desirable to consider a difference in vehicle speeds between the adjacent lanes 108, 110. If the speed difference between the lanes is too large, a lane change is regarded as unsafe. In such examples, a defined speed difference threshold ($\Delta v_0$) between the adjacent lanes 108, 110 may be applied to modify the lane change probability (determined in equation (9) above) for the selected road segment. This modified probability is referred to as a lane merge (or change) feasibility (LMF) and is determined according to equation (10) below. In equation (10), μ represents a constant scaling factor, Δv represents a speed difference between the adjacent lanes 108, 110 (e.g., an average speed difference of vehicles in the adjacent lanes 206, 208), and $f_0$ represents a minimum value of a lane merge feasibility which is required to safely lane merge. In such examples, the constant scaling factor (μ) may be greater than 0 and less than or equal to 1 (e.g., $0<\mu\leq 1$). Additionally, as the value of the speed difference (Δv) increases, the value of the constant scaling factor (μ) decreases.

$$LMF = \mu P(t > t_0) - (1-\mu)\Delta v \geq f_0 \text{ when } \Delta v \geq \Delta v_1 \quad \text{Equation (10)}$$

Then, the control module 304 may determine a modified lane merge feasibility based on lane change and lateral dynamics information. For instance, if a number of crossovers (e.g., a lane change) for the lane in question, such as the lane 110 is greater than a defined threshold, the control module 304 may determine a modified lane merge feasibility according to equation (11) below. For example, in equation (11), the modified lane merge feasibility ($LMF_{Mod}$) is determined based on the previous lane merge feasibility (LMF) from equation (10) and a number of vehicles making lateral moves into and out of the lane. In this example, $L_{in}$ represents the number of vehicles making a lateral move into the lane, $L_{out}$ represents the number of vehicles making a lateral move out of the lane, and σ (sigma) represents a weight value.

$$LMF_{Mod} = LMF - \sigma(L_{in} - L_{out}) \quad \text{Equation (11)}$$

In various embodiments, it may be desirable to modify the lane merge feasibility before altering the lane merge feasibility according to equation (11) above. In such examples, this initial modification may be based on, for example, driver characteristics, road conditions, etc. For example, the control module 304 may modify the probability of having a time gap to change lanes based on a cognitive status of a driver of the vehicle 102, which in turn modifies the lane merge feasibility. As examples only, the cognitive status of the driver may relate to the driver's age, stress level, attentiveness, etc. In such examples, the required vehicle gap distance ($d_0$) may be increased in proportion to the driver's cognitive status, which can be ascertained from their driving behavior, provided via user input, etc. For example, a modified required vehicle gap distance ($d_m$) may be determined according to equation (12) below. In equation (12), $d_0$ represents the original required vehicle gap distance and delta (δ) represents a scaling factor determined based on the intensity of the driver's cognitive status. In such examples, the scaling factor may be greater for older drivers, higher levels of stress, etc. This modified required vehicle gap distance ($d_m$) may be used in place of the required vehicle gap distance ($d_0$) in equation (8) above, which in turn adjusts (e.g., increases) the time gap ($t_1$) required to perform a safe lane change, the lane change probability, and the lane merge feasibility of equations (8)-(11) above.

$$d_m = d_0 + \delta d_0 \quad \text{Equation (12)}$$

Additionally, in some examples, the control module 304 may modify the probability of having a time gap to change lanes based on a condition of the road, which in turn also modifies the lane merge feasibility. For example, the road condition may vary depending on the weather and/or other external factors. In such examples, a poor road condition (e.g., icy, snow covered, snow packed, slushy, wet, etc.) may require an increased required vehicle gap distance as compared to a generally good condition (e.g., dry, etc.). As such, the required vehicle gap distance (do) may be increased in proportion to the road condition, which may be ascertained from sensor input. In such examples, equation (12) may be employed to determine a modified required vehicle gap distance ($d_m$), with the scaling factor (δ) representing a degree of the road condition. For instance, an icy road condition may have a larger scaling factor value than a wet road condition.

Also, in various embodiments, a speed (v) of an upcoming vehicle may be changed based on the road condition and/or the driver's cognitive status. For instance, and with respect to the road condition, a modified speed ($v_m$) may be determined according to equation (13) below. In equation (13), $v_1$ represents the original speed of an upcoming vehicle (from equation (8) above) and delta (δ) represents a scaling factor determined based on a degree of the road condition, as explained above. This modified speed ($v_m$) may be used in place of the speed ($V_1$) in equation (8) above, which in turn adjusts the time gap ($t_1$) required to perform a safe lane change, the lane change probability, and the lane merge feasibility of equations (8)-(11) above.

$$v_m = v - \delta v \quad \text{Equation (13)}$$

With continued reference to FIGS. 3-4, the control module 304 can then identify the selected road segment as a portion of the road 104 to avoid when merging into the lane 110. For example, if the modified lane merge feasibility for the selected road segment is less than a threshold, the control module 304 may identify the selected road segment as a portion of the road 104 to avoid when merging.

In various embodiments, the vehicle system 300 may take one or more actions based on the lane merge feasibility. In some examples, the vehicle system 300 may control one or more vehicle operations of the vehicle 102 based on the identified portion. For instance, the control module 304 of FIG. 3 may transmit one or more signals representative of the identified portion to the vehicle control module 308. Then, the vehicle control module 308 may control at least one operation of the vehicle 102 based on the identified portion. For example, the vehicle control module 308 may generate a control signal for controlling the vehicle 102 to avoid the identified portion when merging into the lane 110, as explained above.

Additionally, the vehicle system 300 may display the identified portion highlighted to indicate a recommendation to avoid when merging into the lane 110. In such examples, the control module 304 may transmit one or more signals representative of the identified portion (or selected road segment), the modified lane merge feasibility, etc. to the display module 306. The display module 306 may then output a visual representation of the identified portion (or the selected road segment) with some or all of the portion highlighted for driver viewing.

Figure 5:
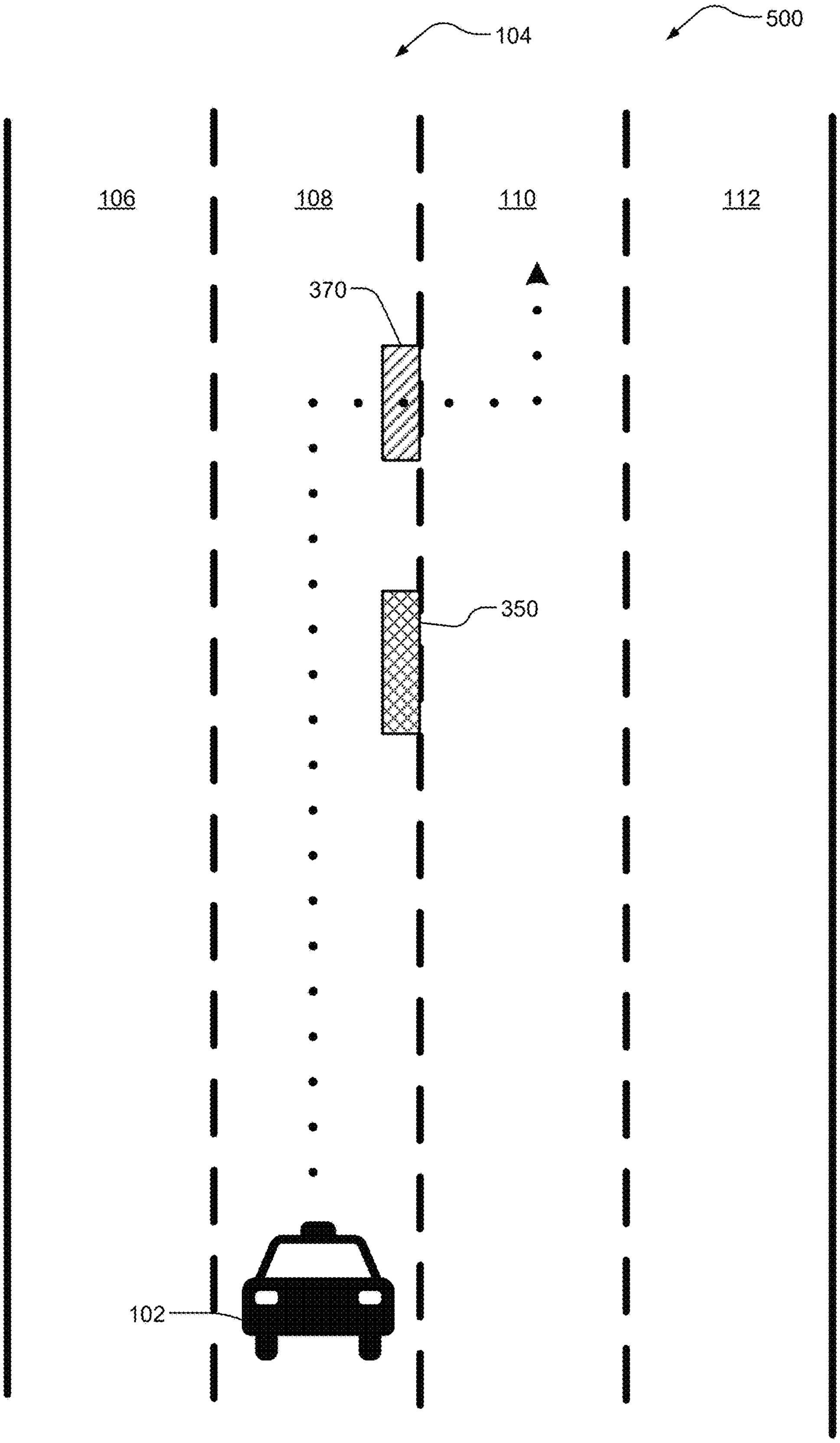
FIG. 5 is a visual representation of the multi-lane road of FIG. 4, with a road segment highlighted indicating a recommendation to avoid this area when merging into an adjacent lane, according to the present disclosure.

For example, FIG. 5 depicts a map 500 including a visual representation of an identified portion highlighted for the driver. This visual representation may be displayed for the driver via the display module 306 of FIG. 3. As shown, the map 500 includes the multi-lane road 104 of FIG. 1 with the lanes 106, 108, 110, 112, as explained above. In this example, the map 500 includes a highlighted portion 350 (shown in a diamond pattern) to indicate a recommendation to avoid when merging into the lane 110. Additionally, in some embodiments, the map 500 may include other highlighted portions, such as a highlighted portion 370 to indicate a recommendation area for the driver to use when merging into the lane 110 (instead of the highlighted portion 350).

Figure 6:
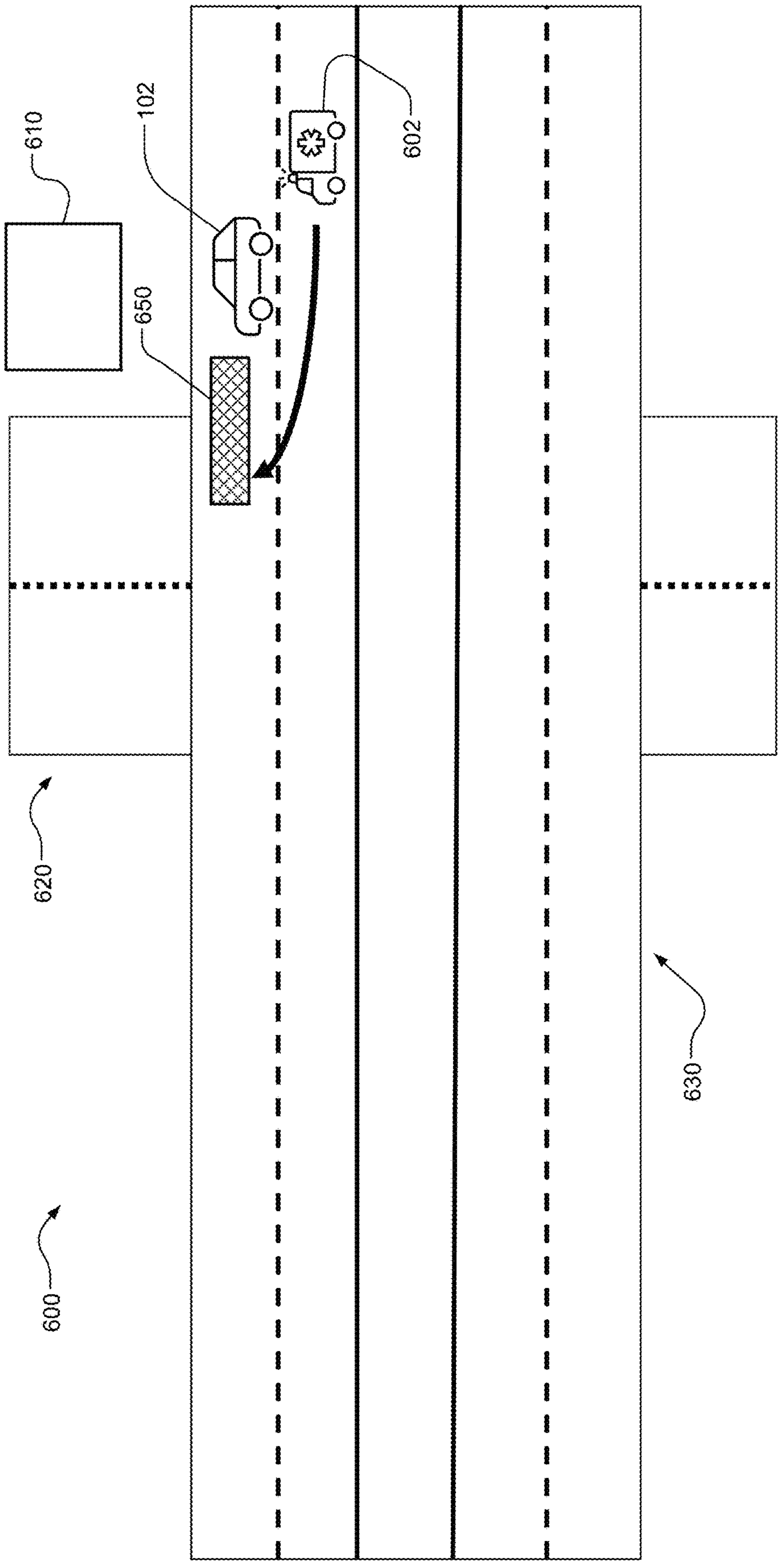
FIG. 6 is a visual representation of a multi-lane road with an intersection and a road segment highlighted indicating a recommendation to avoid this area, according to the present disclosure.

In other examples, the hot lane change situation may be other suitable types of collision prone situations, such as nearby hospitals (or other emergency type locations), fire lanes, delivery lanes, fire hydrant locations, etc. For example, FIG. 6 depicts a map 600 including a visual representation of an identified portion highlighted for driver. In this example, the map 600 includes roads 620, 630, a hospital 610, the vehicle 102, and an emergency vehicle 602. Here, the vehicles 102, 602 are traveling on the road 630 in the same direction, and the roads 620, 630 form an intersection at which the hospital 610 is located. In this example, the vehicle 102 intends to turn onto the road 620 according to, for example, instructions from a navigation system. However, because emergency vehicles, such as the emergency vehicle 602 make frequent and sometimes aggressive lane changes to arrive at the hospital 610, the map 600 includes a highlighted portion 650 (shown in a diamond pattern) to indicate a recommendation to avoid and/or to indicate a recommendation to not block the area.

Figure 7:
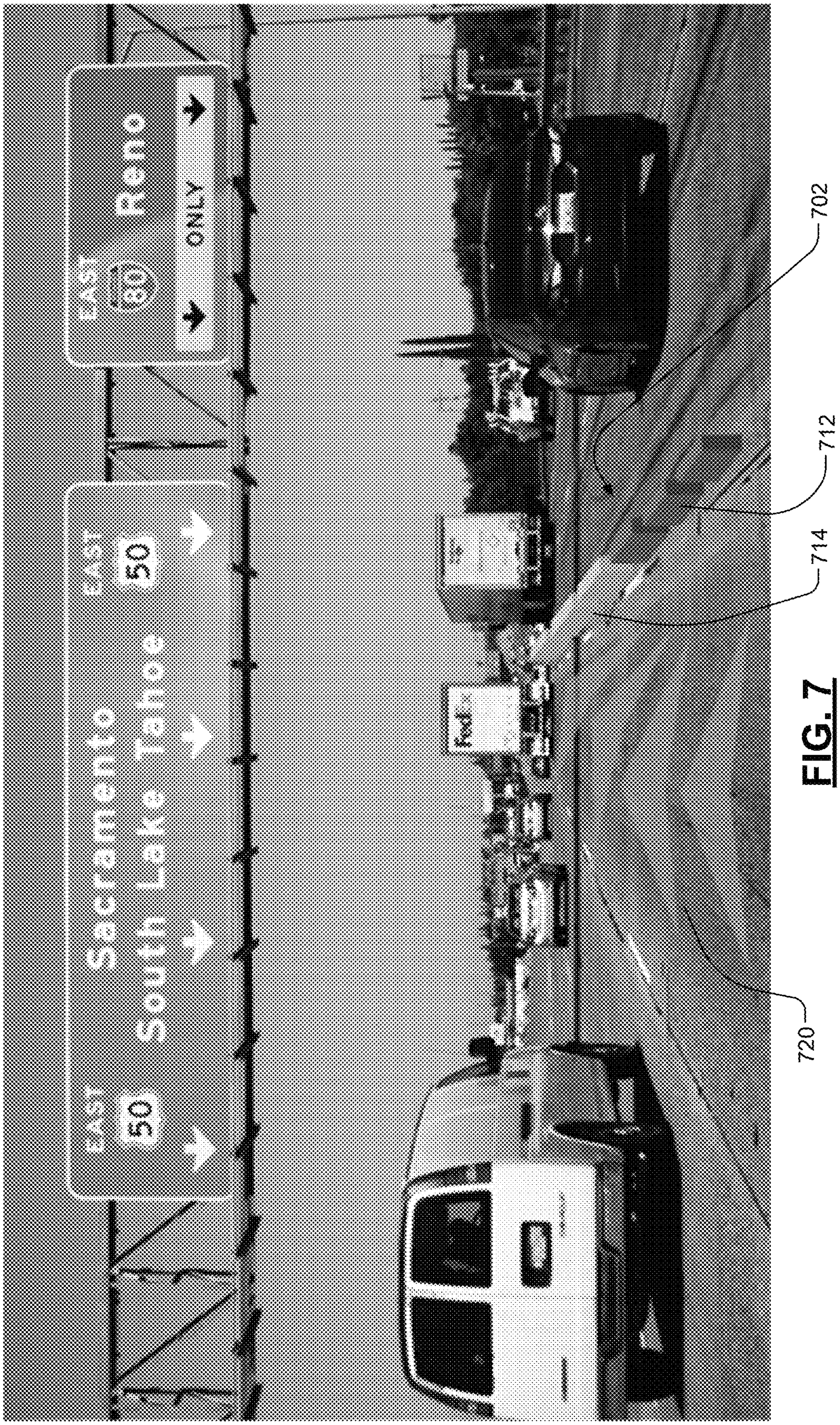
FIG. 7 is an example visual representation including selected road segments with portions highlighted, according to the present disclosure.
Figure 8:
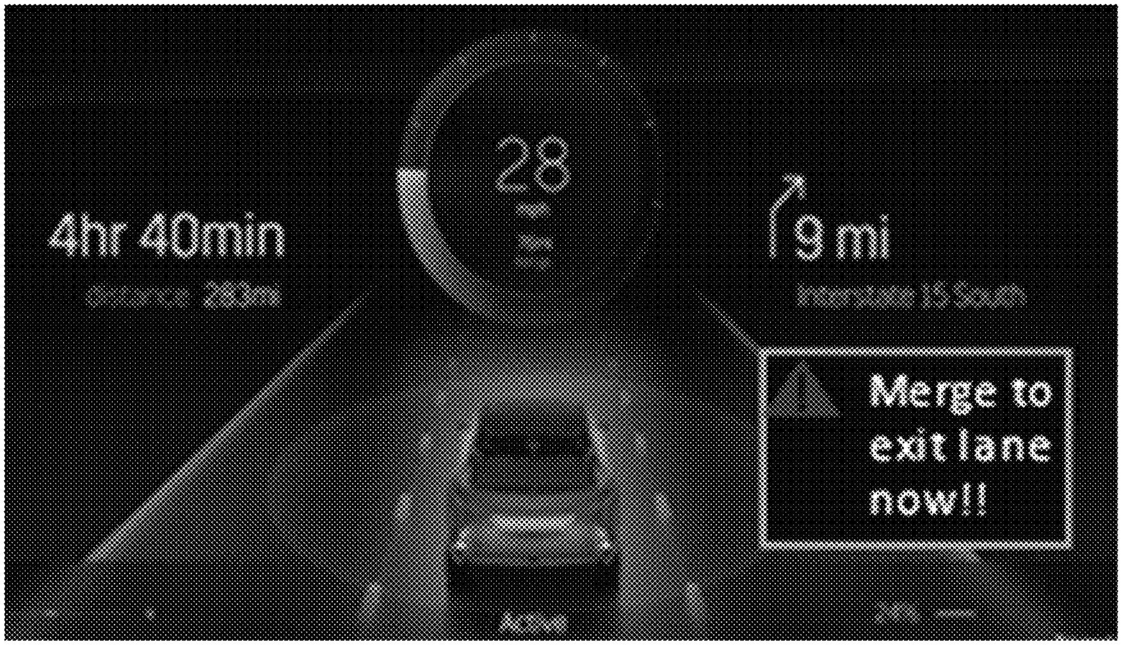
FIGS. 8-9 are example visual representations including notifications instructing a driver to merge, according to the present disclosure.
Figure 9:
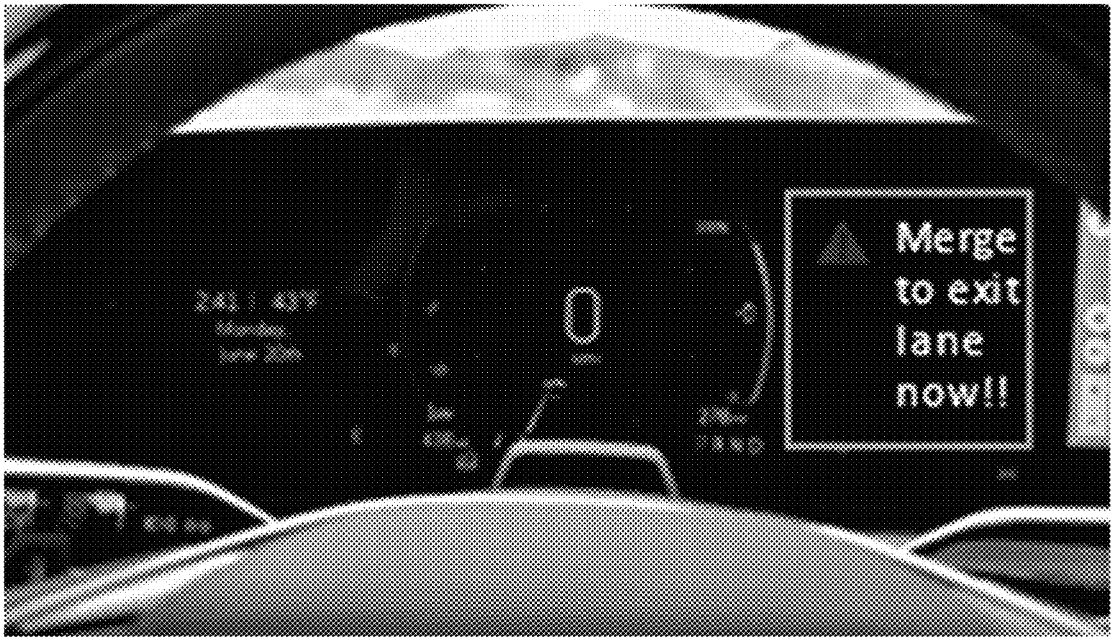

FIGS. 7-9 depict other examples of visual representations 700, 800, 900 that may be provided by the display module 306, such as via a heads-up display in the vehicle 102. For example, in FIG. 7, the visual representation 700 includes a selected road segment 702 with portions 712, 714. In this example, the portion 712 is highlighted red indicating an area to avoid and the portion 714 is highlighted green indicating an area to use for merging. The visual representation 700 also includes arrows 720 directing the driver of the vehicle 102 to merge in the portion 714.

In FIGS. 8-9, the visual representation 800, 900 provide examples of notifications instructing a driver to "merge to exit lane now."

FIGS. 10-13 illustrate example control processes 1000, 1100, 1200, 1300 employable by the vehicle system 300 of FIG. 3. Although the example control processes 1000, 1100, 1200, 1300 are described in relation to the vehicle system 300 of FIG. 3 including the control module 304, the display module 306, the vehicle control module 308, and/or the control module 316, any one of the control processes 1000, 1100, 1200, 1300 may be employable by another suitable system and/or other suitable modules if desired.

Figure 10:
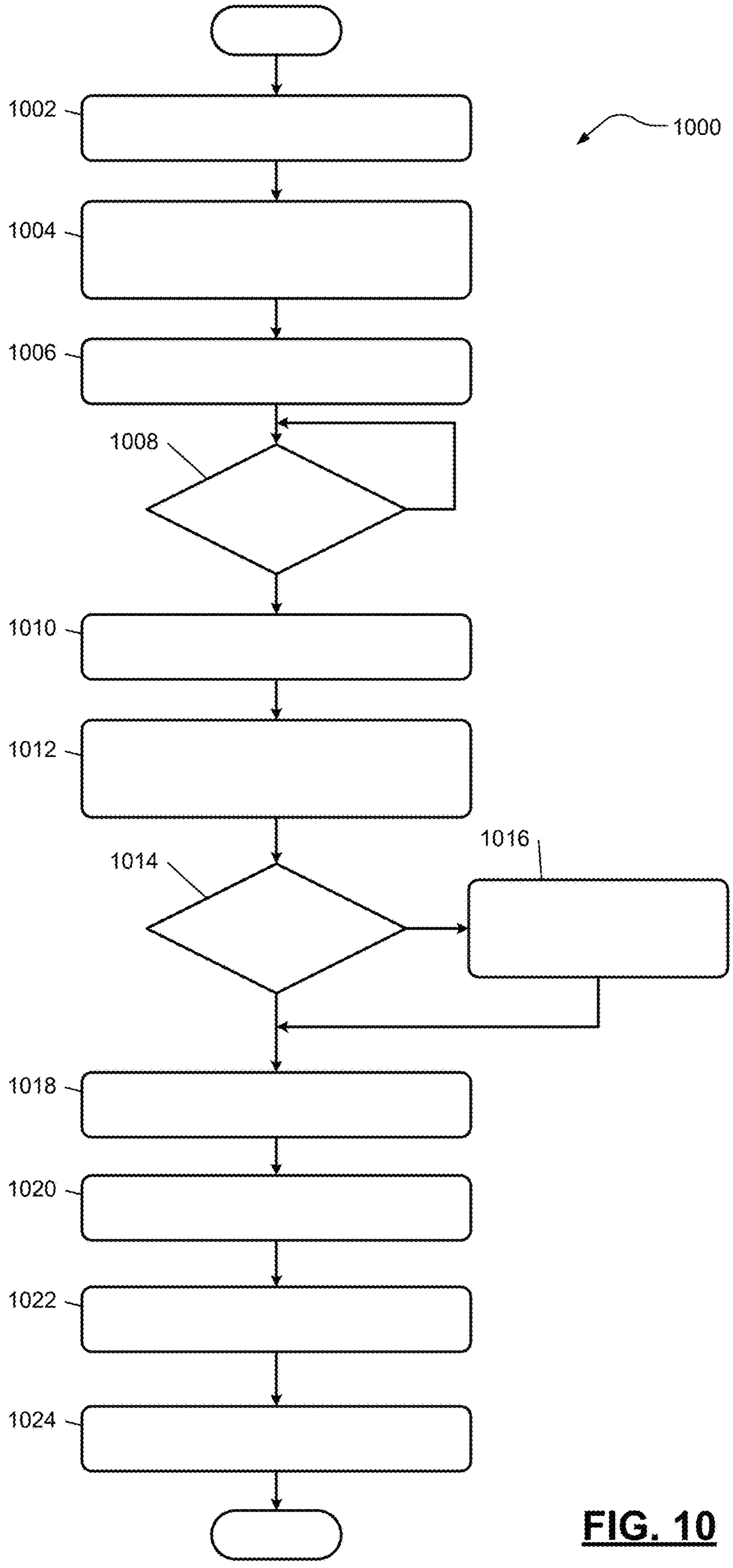
FIG. 10 is a flowchart of an example control process for providing visual representations of vehicle lane recommendations, according to the present disclosure.

The control process 1000 is implemented for providing visual representations with an identified portion highlighted to indicate a recommendation to avoid. As shown in FIG. 10, the control process 1000 begins at 1002 by identifying road segments in a defined region. In such examples, the control module 316 of FIG. 3 may identify such road segments based on based on crowdsourced data. For example, and as explained above, the control module 316 may cluster location data (from the crowdsourced data) in the defined region relating to where vehicles have merged and then identify road segments associated with each cluster. The control process 1000 then proceeds to 1004.

At 1004, the control module 316 determines one or more reliability scores for each road segment for different driving conditions. For example, and as explained above, the control module 316 may determine the reliability score(s) based on the frequency of which the vehicles have traveled through an area of interest. In such examples, the control module 316 may determine familiarity scores for the vehicles and then determine the reliability scores for the road segments based on the familiarity scores, as explained above. The control process 1000 then proceeds to 1006.

At 1006, the control module 316 optionally modifies the reliability scores based on one or more conditions. For example, and as explained above, the control module 316 may modify the reliability scores based on lane change occurrences (or events), the type of each lane change occurrence, a number of vehicles changing lanes at a given instance, etc. The control process 1000 then proceeds to 1008.

At 1008, control determines whether the vehicle 102 is intending to merge into a lane (e.g., the lane 110) according to, for example, instructions from a navigation system. For example, the control module 304 of FIG. 4 may make this determination based on inputs from the navigation system (e.g., a mapping system) tracking and providing instructions about upcoming maneuvers to reach a desired location. If yes at 1008, the control process 1000 proceeds to 1010. Otherwise, if no at 1008, the control process 1000 returns to 1008. In other examples, the control process 1000 may return to another suitable step (e.g., 1002, etc.) if desired.

At 1010, the control module 304 determines a current driving condition associated with the vehicle 102. For example, and as explained above, the control module 304 may determine the current driving condition based on inputs from the sensors 310, 312, 314, inputs from other onboard sensors, and/or inputs from external sources. The control process 1000 then proceeds to 1012, where the control module 304 selects a road segment of the identified road segments with the highest reliability score that corresponds to the current driving condition. The control process 1000 then proceeds to 1014.

At 1014, the control module 304 determines whether a time gap requirement to change lanes needs to be modified. For example, and as explained above, a time gap requirement to change lanes may be modified based on driver characteristics, road conditions, etc. In such examples, a required vehicle gap distance may be modified based on a cognitive status of the driver, a condition of the road, etc., which in turn modified the time gap requirement, as explained above. This determination as to whether a time gap requirement to change lanes needs to be modified may be ascertained from user input, driving behavior obtained from onboard sensors, environmental conditions (e.g., road conditions, weather conditions, etc.) obtained from onboard sensors and/or external sources, etc. If no at 1014, the control process 1000 proceeds to 1018. If yes at 1014, the control process 1000 proceeds to 1016 where the control module 304 modifies the time gap requirement based on one or more conditions, as explained above. The control process 1000 then proceeds to 1018.

At 1018, the control module 304 determines a lane merge feasibility for the selected road segment (or individual portions therein). For example, the control module 304 may implement the equation (10) above to determine a lane merge feasibility for the selected road segment (or individual portions therein). The control process 1000 then proceeds to 1020.

At 1020, the control module 304 determines a modified lane merge feasibility for the selected road segment (or individual portions therein) based on lane change and lateral dynamics information. For example, and as explained above, the control module 304 may implement the equation (11) above to determine a modified lane merge feasibility based on a number of vehicles making lateral moves into and out of the lane and the lane merge feasibility of 1018. The control process 1000 then proceeds to 1022, where the control module 304 identifies the selected road segment as a portion to avoid when merging into the lane, as explained above. The control process 1000 then proceeds to 1024.

At 1024, the display module 306 outputs a visual representation with the identified portion highlighted to indicate a recommendation to avoid when merging into the lane, as explained above. The control process 1000 then ends as shown in FIG. 10. Alternatively, the control process 1000 may return to another step, such as 1008 if desired.

Figure 11:
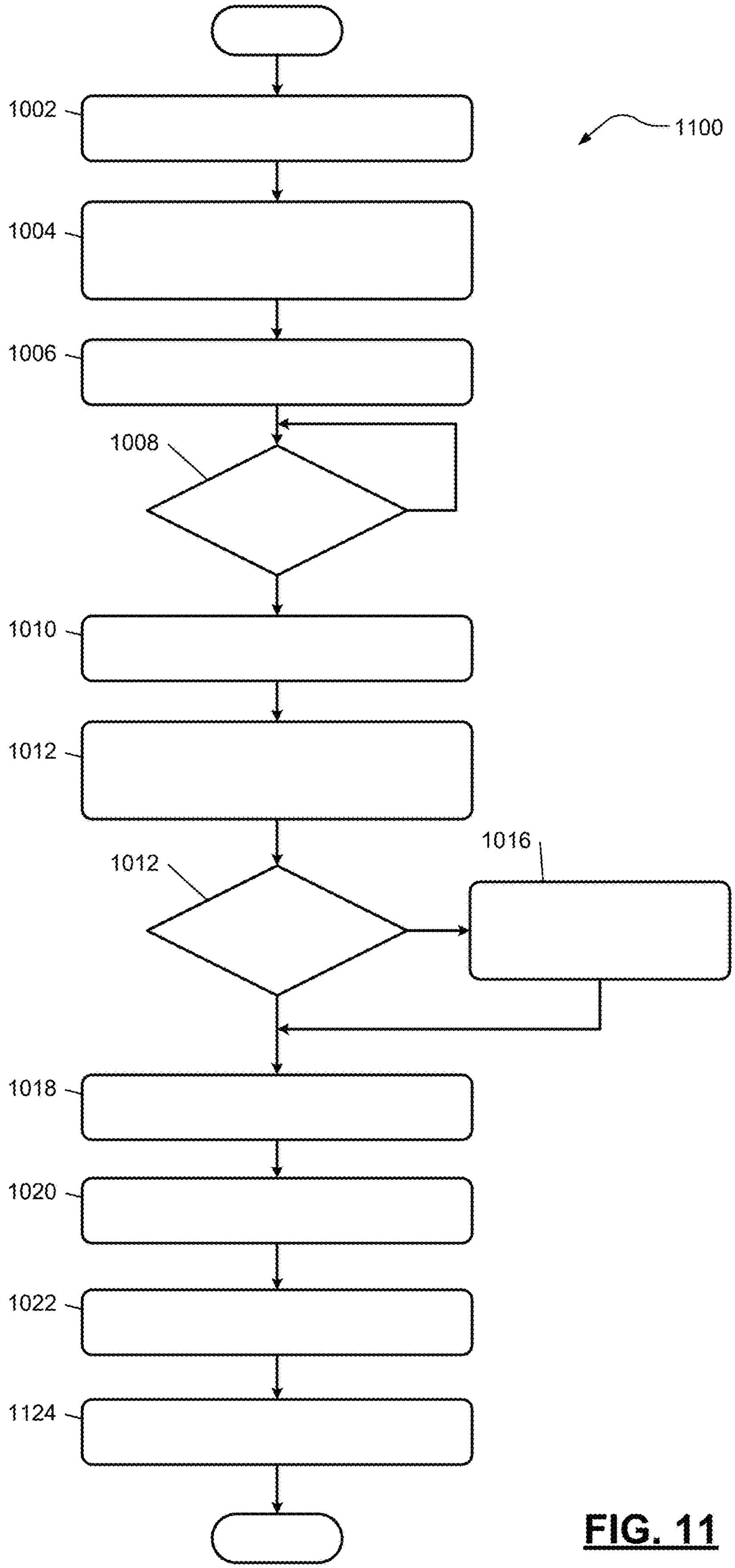
FIG. 11 is a flowchart of an example control process for controlling a vehicle based on vehicle lane recommendations, according to the present disclosure.

The control process 1100 of FIG. 11 is implemented for controlling a vehicle to void an identified portion of a road when merging lanes. In FIG. 11, the control process 1100 is similar to the control process 1000 of FIG. 10 but includes an alternative step. For example, and as shown in FIG. 11, the control process 1100 includes 1002, 1004, 1006, 1008, 1010, 1012, 1014, 1016, 1018, 1020, 1022 of FIG. 10 as explained above, and then proceeds to 1124. At 1124, the vehicle control module 308 controls at least one operation of the vehicle 102 based on the identified portion (from 1022). For example, and as explained above, the vehicle control module 308 may generate a control signal for controlling the vehicle 102 to avoid the identified portion. The control process 1100 then ends as shown in FIG. 11. Alternatively, the control process 1100 may return to another step, such as 1008 if desired.

Figure 12:
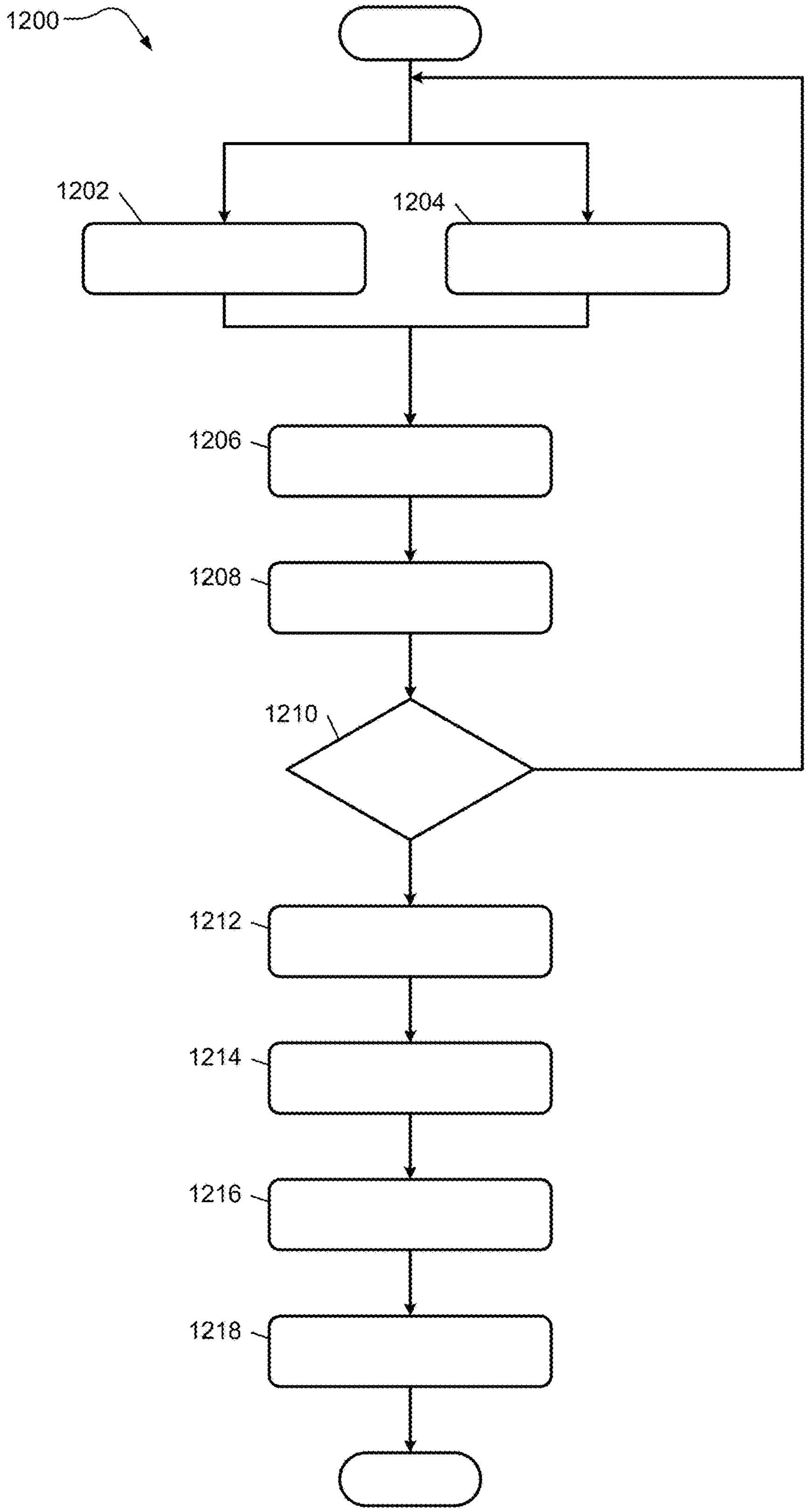
FIG. 12 is a flowchart of an example control process for determining familiarity scores, according to the present disclosure.
Figure 13:
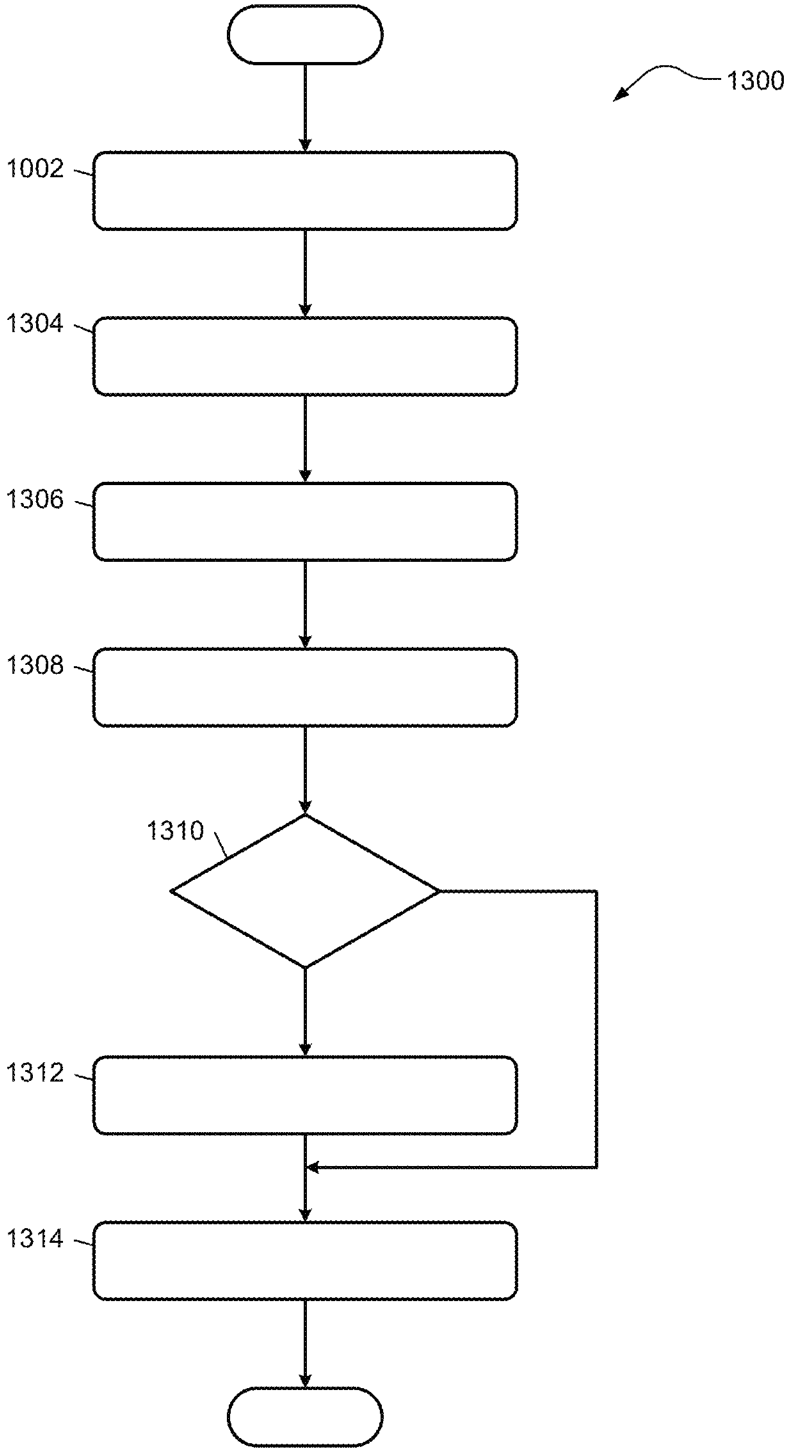
FIG. 13 is a flowchart of an example control process for determining reliability scores, according to the present disclosure.

The control processes 1200, 1300 of FIGS. 12 and 13 are implemented for determining familiarity scores and reliability scores, respectively. In FIG. 12, the control process 1200 begins at 1202, 1204. At 1202, the control module 316 receives crowdsourced telemetry data (as explained above). At 1204, the control module 316 receives road level map data (e.g., an open street map (OSM), etc.). Then, the control process 1200 proceeds to 1206. At 1206, the control module 316 implements a map matching process to coordinate the crowdsourced telemetry data and the road level map data. The control process 1200 then proceeds to 1208.

At 1208, the control module 316 receives lane level map data. For example, the lane level map data may include detailed information (e.g., lane level details), such as lane boundaries, associated timestamps, etc. The control process 1200 then proceeds to 1210, where the control module 316 determines if a lane change/merge is detected. In such examples, this determination may be made based on the coordinated crowdsourced telemetry data and the road level map data, and the lane level map data. If yes at 1210, the control process 1200 proceeds to 1212. 1214. If no at 1210, the control process 1200 returns to 1202, 1204.

At 1212, the control module 316 aggregates location data from the crowdsourced telemetry data. Then, at 1214, the control module 316 aggregates vehicle IDs associated with the location data. For example, the control module 316 may aggregate particular location data relative to a defined region at the lane change/merge location and the vehicle IDs for the vehicles providing such location data. The control process 1200 then proceeds to 1216.

At 1216, the control module 316 determines a cumulative frequency for the vehicles based on the vehicle IDs. For example, the control module 316 may identify each vehicle (based on its vehicle ID) that has passed through an area of interest and separate the vehicle occurrences based on the level of area familiarity of the vehicles. In such examples, the vehicle occurrences for different levels of familiarity may be aggregated into multiple, distinct vehicle counts. In this example, each vehicle count may represent a number of vehicles which pass through the area of interest per a defined time occurrence (e.g., daily, weekly, etc.). The control process 1200 then proceeds to 1218.

At 1218, the control module 316 determines familiarity scores for the vehicles in each road segment based on the cumulative frequency of 1216 and weighted values. For example, and as explained above, the control module 316 may determine familiarity scores by multiplying each vehicle count for a different level of familiarity and a corresponding weight value. The control process 1200 then ends as shown in FIG. 12.

In FIG. 13, the control process 1300 begins at 1002 of FIG. 10, where the control module 316 identifies road segments in a defined region for merging into a lane, such as from the lane 110. The control process 1300 then proceeds to 1304.

At 1304, the control module 316 determines familiarity scores for vehicles in the road segments. For example, the control module 316 may implement the control process 1200 of FIG. 12 for determining the familiarity scores. The control process 1300 then proceeds to 1306, where the control module 316 determines a reliability score for each road segment. For example, and as explained above, the control module 316 may determine such reliability scores according to equation (1). The control process 1300 then proceeds to 1308, the control module 316 may optionally determine reliability scores for each road segment for different driving conditions (as explained above). The control process 1300 then proceeds to 1310.

At 1310, the control module 316 determines whether modifications to the reliability scores are desired. This may be determined based on user input, detected driving characteristics of other vehicles, etc. If yes at 1310, the control process 1300 proceeds to 1312. If no at 1310, the control process 1300 proceeds to 1314.

At 1312, the control module 316 modifies the reliability scores based on one or more conditions. For example, and as explained above, the control module 316 may modify the reliability scores based on the lane change occurrences (or events), the type of each lane change occurrence, a number of vehicles changing lanes at a given instance, etc. The control process 1300 then proceeds to 1314.

At 1314, the control module 316 stores information for each road segment in a database. For example, and as explained above, the control module 316 may store the determined reliability scores (whether modified or not) for the different road segments along with driving conditions corresponding to the reliability scores. This database (or data therein) may be accessible and/or provided to the control module 304 for creating lane merging recommendations, as explained above.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle system for providing vehicle lane recommendations for a vehicle traveling on a road, the vehicle system:

a control module configured to:

determine one or more reliability scores for each road segment of a plurality of road segments of a lane on the road based on a frequency of which each vehicle of a plurality of past vehicles has traveled through the road segments of the road;

modify the one or more reliability scores for each road segment based on at least one of a number of current vehicles changing lanes in that road segment as the vehicle travels along the road and a time taken for the current vehicles to change lanes in that road segment as the vehicle travels along the road;

select a road segment of the road segments with the highest modified reliability score;

determine a probability of having a time gap to change lanes for the vehicle based on an expected headway value;

determine a lane merge feasibility for the selected road segment based on a vehicle lane change ratio for the current vehicles and the probability of having the time gap to change lanes, wherein the vehicle lane change ratio represents a ratio of a number of safe lane changes performed by the current vehicles to a total number of desired lane changes;

determine a modified lane merge feasibility for the selected road segment based on the lane merge feasibility and a number of the current vehicles making lateral moves into and out of the lane; and identify the selected road segment as a portion of the road to avoid when merging into the lane based on the modified lane merge feasibility; and a display module in communication with the control module, the display module configured to output a visual representation of the portion highlighted to indicate a recommendation to avoid when merging into the lane.

2. The vehicle system of claim 1, further comprising a vehicle control module in communication with the control module, the vehicle control module configured to control the vehicle to avoid the portion when merging into the lane.

3. The vehicle system of claim 1, wherein the control module is configured to modify the one or more reliability scores for each road segment based on a number of lane change events, a severity of each lane change event, and braking incidents associated with each lane change event.

4. The vehicle system of claim 1, wherein the control module is configured to modify the one or more reliability scores for each road segment based on the number of current vehicles changing lanes and the time taken for the current vehicles to change lanes.

5. The vehicle system of claim 1, wherein:

each reliability score for each road segment is specific to a different driving condition; and the control module is configured to select the road segment with the highest reliability score having the driving condition that corresponds to a current driving condition associated with the vehicle.

6. The vehicle system of claim 5, wherein the driving condition includes at least one of a different time of day, a different road condition, and a different weather condition.

7. The vehicle system of claim 1, wherein the control module is configured to modify the time gap to change lanes based on a cognitive status of a driver of the vehicle, thereby adjusting the lane merge feasibility.

8. The vehicle system of claim 1, wherein the control module is configured to:

determine a cognitive status value of a driver of the vehicle; and in response to the cognitive status value of the driver being greater than a threshold, identify another road segment prior to the portion of the road to avoid for merging into the lane.

9. The vehicle system of claim 1, wherein the control module is configured to modify the time gap to change lanes based on a condition of the vehicle, thereby adjusting the lane merge feasibility.

10. A vehicle system for providing vehicle lane recommendations for a vehicle traveling on a road, the vehicle system:

a control module configured to:

determine one or more reliability scores for each road segment of a plurality of road segments of a lane on the road based on a frequency of which each vehicle of a plurality of past vehicles has traveled through the road segments of the road;

modify the one or more reliability scores for each road segment based on at least one of a number of current vehicles changing lanes in that road segment as the vehicle travels along the road and a time taken for the current vehicles to change lanes in that road segment as the vehicle travels along the road;

select a road segment of the road segments with the highest modified reliability score;

determine a probability of having a time gap to change lanes for the vehicle based on an expected headway value;

determine a lane merge feasibility for the selected road segment based on a vehicle lane change ratio for the current vehicles, and the probability of having the time gap to change lanes, wherein the vehicle lane change ratio represents a ratio of a number of safe lane changes performed by the current vehicles to a total number of desired lane changes;

determine a modified lane merge feasibility for the selected road segment based on the lane merge feasibility and a number of the current vehicles making lateral moves into and out of the lane; and identify the selected road segment as a portion of the road to avoid when merging into the lane based on the modified lane merge feasibility; and a vehicle control module in communication with the control module, the vehicle control module configured to control the vehicle to avoid the portion when merging into the lane.

11. The vehicle system of claim 10, wherein the control module is configured to modify the one or more reliability scores for each road segment based on a number of lane change events, a severity of each lane change event, and braking incidents associated with each lane change event.

12. The vehicle system of claim 11, wherein the control module is configured to modify the one or more reliability scores for each road segment based on the number of current vehicles changing lanes and the time taken for the current vehicles to change lanes.

13. The vehicle system of claim 10, wherein:

each reliability score for each road segment is specific to a different driving condition; and the control module is configured to select the road segment with the highest reliability score having the driving condition that corresponds to a current driving condition associated with the vehicle.

14. The vehicle system of claim 13, wherein the driving condition includes at least one of a different time of day, a different road condition, and a different weather condition.

15. The vehicle system of claim 10, wherein the control module is configured to modify the time gap to change lanes based on a cognitive status of a driver of the vehicle, thereby adjusting the lane merge feasibility.

16. The vehicle system of claim 10, wherein the control module is configured to:

determine a cognitive status value of a driver of the vehicle; and in response to the cognitive status value of the driver being greater than a threshold, identify another road segment prior to the portion of the road to avoid for merging into the lane.

17. The vehicle system of claim 10, wherein the control module is configured to modify the time gap to change lanes based on a condition of the road, thereby adjusting the lane merge feasibility.

18. A vehicle control method for providing vehicle lane recommendations for a vehicle traveling on a road and approaching an interchange, the vehicle control method comprising:

determining one or more reliability scores for each road segment of a plurality of road segments of the road based on a frequency of which each vehicle of a plurality of past vehicles has traveled through the road segments of the road, wherein each reliability score for each road segment is specific to a different driving condition;

modifying the one or more reliability scores for each road segment based on at least one of a number of current vehicles changing lanes in that road segment as the vehicle travels along the road and a time taken for the current vehicles to change lanes in that road segment as the vehicle travels along the road;

selecting a road segment of the road segments with the highest modified reliability score having the driving condition that corresponds to a current driving condition associated with the vehicle;

determining a probability of having a time gap to change lanes for the vehicle based on an expected headway value;

determining a lane merge feasibility for the selected road segment based on a vehicle lane change ratio for the current vehicles and the probability of having the time gap to change lanes, wherein the vehicle lane change ratio represents a ratio of a number of safe lane changes performed by the current vehicles to a total number of desired lane changes;

determining a modified lane merge feasibility for the selected road segment based on the lane merge feasibility and a number of the current vehicles making lateral moves into and out of the lane;

identifying the selected road segment as a portion of the road to avoid when merging into the lane based on the modified lane merge feasibility; and outputting a visual representation of the portion highlighted to indicate a recommendation to avoid when merging into the lane.

19. The vehicle control method of claim 18, further comprising controlling the vehicle to avoid the portion when merging into the lane.

20. The vehicle control method of claim 18, further comprising modifying the one or more reliability scores for each road segment based on a number of lane change events, a severity of each lane change event, and braking incidents associated with each lane change event.

* * * * *